United States Patent
Shinohara et al.

(10) Patent No.: US 7,420,562 B2
(45) Date of Patent: Sep. 2, 2008

(54) CHART DISPLAY DEVICE AND PROGRAM FOR THE SAME

(75) Inventors: Noboru Shinohara, Tokyo (JP); Naohito Doi, Tokyo (JP); Kazuhiro Tsuchida, Tokyo (JP); Miho Hiraga, Tokyo (JP)

(73) Assignee: I-N Information Systems, Ltd., Tokyo (JP)

( * ) Notice: Subject to any disclaimer, the term of this patent is extended or adjusted under 35 U.S.C. 154(b) by 139 days.

(21) Appl. No.: 11/332,282

(22) Filed: Jan. 17, 2006

(65) Prior Publication Data
US 2007/0046672 A1 Mar. 1, 2007

(30) Foreign Application Priority Data
Aug. 29, 2005 (JP) ............................. 2005-247621

(51) Int. Cl.
*G06T 11/20* (2006.01)
*G09G 5/00* (2006.01)
(52) U.S. Cl. ..................... 345/440; 345/619; 345/660; 345/418; 345/665
(58) Field of Classification Search .............. 345/440, 345/418, 440.2, 619, 660, 665, 666; 715/700, 715/788
See application file for complete search history.

(56) References Cited
U.S. PATENT DOCUMENTS
5,483,468 A * 1/1996 Chen et al. ................. 345/418

| 6,590,577 | B1 * | 7/2003 | Yonts ......................... 345/440 |
| 6,888,543 | B2 * | 5/2005 | Ingber et al. ................. 715/788 |
| 2004/0179012 | A1 * | 9/2004 | Ingber et al. ................. 345/440 |
| 2006/0028471 | A1 * | 2/2006 | Kincaid et al. .............. 345/440 |

FOREIGN PATENT DOCUMENTS
JP 2003-288486 10/2003

OTHER PUBLICATIONS

Diane Koers "Microsoft Office Excel 2003 Fast & Easy", 2004, p. 202.*
Stinson, C., et al., "Microsoft Office Excel 2003," Microsoft Press, Redmond, Washington, 2004, XP002463615.
Search Report mailed form the European Patent Office on Jan. 21, 2008.

* cited by examiner

*Primary Examiner*—Chante Harrison
(74) *Attorney, Agent, or Firm*—Staas & Halsey LLP (57) ABSTRACT

A graph creation unit of a chart display device desplays a plurality of charts (graphs), which is created by applying one graph-model form to a plurality of categories in a category list file, onto one graph destination sheet, by aligning and arranging the charts in the one graph destination sheet. The graph creation unit makes an economic statistics data control unit obtain a predetermined numerical values corresponding to the chart displayed on the graph destination sheet from an accumulated database or an economic statistics database server, and displays the obtained numerical values on the graph destination sheet in the form of individual chart.

6 Claims, 8 Drawing Sheets

CHART DISPLAY DEVICE AND PROGRAM FOR THE SAME

BACKGROUND OF THE INVENTION

1. Field of the Invention

The present invention relates to a chart display device for creating and displaying a chart, and program for the same.

2. Prior Art of the Invention

Charts or graphs such as line graphs, etc. have been used for displaying numeric values or changes in the numeric values, and used at ordinary presentations or presentations at scientific meetings, etc. A simple and easy method to create a graph has so far been desired. Various graph display systems for smoothly creating graphs using a terminal of a personal computer have been proposed (Japanese laid open patent publication No. 2003-288486).

An easy-to-read display of a plurality of graphs can be achieved by a graph arrangement in which each graph has the same plot area size and is aligned and displayed. In the prior art described above, however, a plurality of graphs created in advance are copied and pasted on one display sheet by adjusting their size and position and aligning them on the display sheet. Such work consumes a lot of time and energy. In addition, in the case where new data are freshly added, after alignment of these graphs is completed, sizes of the plot areas of some graphs must be changed in concert with an increase in the volume of the data to be freshly added, causing deterioration in appearance of the display sheet. In such case in the above-mentioned prior art, operators of the computer must manually re-adjust the size and location of the graphs in the display sheet on the computer screen, consuming a lot of time and energy, too.

SUMMARY OF THE INVENTION

The present invention was made to solve such problems described above, and to provide a chart (or graph) display device and system which can save burdens on operators who prepare documents, by improving in creating a plurality of graphs on a graph display sheet and by improving in carrying out adjustment of the size of the graphs displayed on the graph display sheet.

The graph display device of the present invention, which can solve the problems mentioned above, comprises:

model-form information obtaining means for obtaining a size information of a previously prepared graph-model form;

display-style decision means for deciding a display size and a display position of the graph-model form on a graph display sheet on which a graph is screen-displayed;

model-form display means having a function of copying the graph-model form, adjusting the display size of the copied graph-model form based on the decision of the display-style decision means, and displaying the adjusted graph-model form or a plurality of the adjusted graph-model forms at the display position of the graph display sheet; and numerical-value obtaining and displaying means for obtaining a predetermined numerical-value information and creating the graph by plotting the predetermined numerical-value information onto the adjusted graph-model form displayed on the graph display sheet.

The second aspect of the present invention is characterized in that the graph display device further has recording means for recording a category information as a forming unit of the graph, wherein the display-style decision means obtains the category information and decides the display size and the display position of the graph-model forms based on the number of the category, and the numerical-value obtaining and displaying means obtains the predetermined numerical-value information corresponding to the category, and graphically displays the predetermined numerical-value information onto the adjusted graph-model form displayed on the graph display sheet.

The third aspect of the present invention is characterized in that the model-form display means displays a plurality of the adjusted graph-model forms on the graph display sheet in a matrix manner.

The fourth aspect of the present invention is characterized in that the graph display device further comprises graph amendment means for adjusting the size of a plurality of the graphs displayed on the graph display sheet so that all of the graphs have approximately the same display size.

The fifth aspect of the present invention is related to a program which makes a computer function as the graph display device according to any one of aspects described above.

According to the first aspect of the present invention, the graph display device has following functions:

obtaining a size information of a previously prepared graph-model form;

deciding a display size and a display position of the graph-model form on a graph display sheet;

displaying an adjusted graph-model form which is copied from the graph-model form and whose display size is adjusted based on the decision of the display-style decision means; and creating, after obtaining the predetermined numerical-value information, a graph by plotting the predetermined numerical-value information on the graph-model form displayed on the graph display sheet.

Thereby, a plurality of the graph-model forms are displayed on the graph display sheet, and the predetermined numerical-value information is graphically displayed on these graph-model forms respectively. Therefore a plurality of the graphs can be displayed on the same graph sheet, being able to reduce a burden on operators who prepare documents.

According to the second aspect of the present invention, the display size and the display position of the graph-model form are decided based on the information on the number of the category which corresponds to the forming unit of the graph, so that the size and position of the graph to be displayed on the graph display sheet can be decided based on the number of graphs. Therefore, all graphs can be displayed in such a well-balanced manner that the graphs are adjusted in size and position in the graph display sheet based on the number of graphs. Furthermore, the predetermined numerical-value information which corresponds to the category is displayed on the graph-model forms on the graph display sheet so that the numerical-value information of each category can be displayed on each graph respectively, which is displayed using the same graph-model form. Therefore the numerical-value information of a plurality of categories can be displayed in an easy-to-read style.

According to the third aspect of the present invention, a plurality of the graph-model forms are displayed approximately in a matrix manner on the graph display sheet, so that the numerical-value information of a plurality of categories can be graphically displayed in a much easier-to-read manner.

According to the fourth aspect of the present invention, the display size of a plurality of graphs displayed on the graph display sheet is adjusted to have approximately the same size. The size of the plot area can be adjusted to have the same size, even though the size of the plot area of each graph is different. Thus a plurality of graphs can be displayed on the same screen in an easy-to-ready style. And burdens on operators who prepare documents can be reduced.

According to the fifth aspect of the present invention, the present invention can be used in various computer hardware through programming and downsizing.

DETAILED DESCRIPTION

The present invention will be explained more precisely.

Embodiment of the Present Invention

Figure 1:
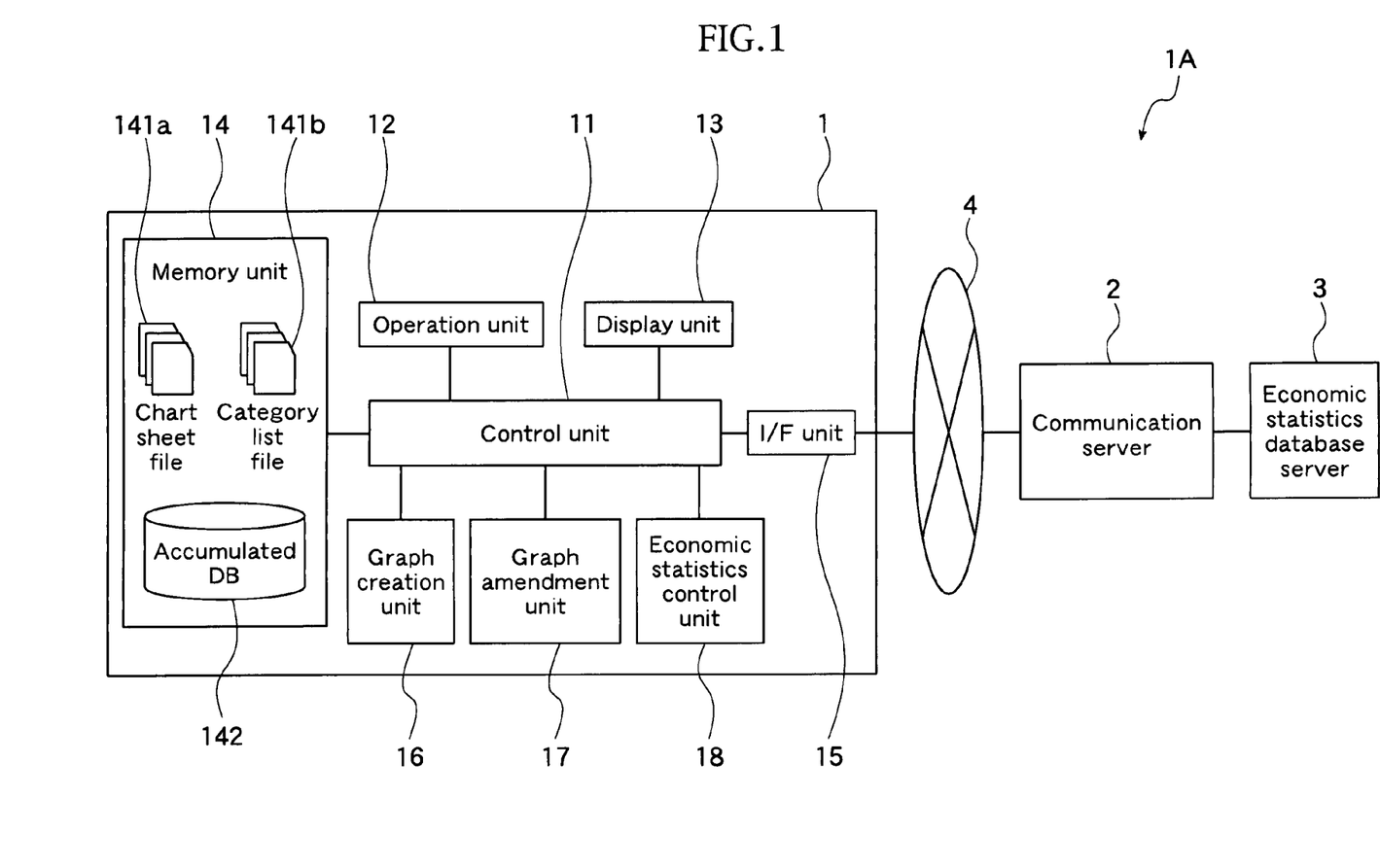
FIG. 1 is a system configuration and a functional block diagram showing a chart display system of the present invention.

FIG. 1 is a system configuration and a functional block diagram showing a graph display system of the present invention. As shown in FIG. 1, the chart display system 1A comprises a graph display device 1, a communication server 2, an economic statistics database server 3 and the internet 4.

The graph display device 1 is represented by a computer terminal having a communication function, such as a personal computer, mobile computer, PDA (Personal Digital Assistance), radio communication terminal, etc., and is operative in a network environment. As shown in FIG. 1, the graph display device 1 has a control unit 11, operation unit 12, display unit 13, memory unit 14, interface unit (I/F unit) 15, graph creation unit (model-form information obtaining means, display-style decision means, model-form display means and numerical-value obtaining and displaying means) 16, graph amendment unit (graph amendment means) 17, and economic statistics data control unit (data control means) 18.

The control unit 11 has a CPU (Central Processing Unit) which performs arithmetical processing of OS (Operating System) programs and various application programs recorded in the memory unit 14 and also controls all document creation procedures in concert with the results of such arithmetical processing. In this embodiment, function and control of the graph creation unit 16, graph amendment unit 17 and economic statistics data-control unit 18 are performed by arithmetical processing at the CPU in the control unit 11, where OS programs and application programs recorded on the memory unit 14 are arithmetically processed.

The operation unit 12 includes a mouth, keyboard, etc., and is used for inputting various directions into the graph display device 1 and the communication server 2. The display unit 13 includes LCD, etc., and is used for displaying various directions or images inputted through the operation unit 12. The interface unit 15 means a UTP cable port, light cable port, various device drivers, etc., and is used for connecting a LAN cable or a light cable and for performing a process necessary for data communication with the communication server 2.

The graph creation unit 16 is used for obtaining necessary information for creation of graphs and performing processes necessary for displaying one or a plurality of created graphs on the graph display sheet. The graph amendment unit 17 performs processes for adjusting the size of the created graphs displayed on the display sheet.

The economic statistics data-control unit 18 performs communications with the communication server 2 through the interface unit 15 and controls economic statistics data recorded on an accumulated database (to be described later) of the memory unit 14. Communications between the economic statistics data-control unit 18 and the communication server 2 is performed through a HTTP protocol.

The memory unit 14 includes ROM in which programs and data, which are used by the control unit 11 at the time of various processing, are previously stored, RAM which temporarily memorizes programs and data, etc., EEPROM in which data necessary to be updated are stored, a hard disk for memorizing various file data, etc. OS programs as well as application programs, which control the graph creation unit 16, graph amendment unit 17 and economic statistics data-control unit 18 and make these units function, are recorded on the ROM. In the RAM, frequently-used programs and files are temporarily recorded. Working region for the accumulated database (accumulated DB) 142 is secured in the RAM. Predetermined numerical-value information (to be described later) obtained from the economic statistics data base server 3 is classified by attaching a code (to be described later) of each category and accumulated in the accumulated database 142. A file data of a sheet, which serves as a minimum unit for recordation and handling (hereinafter called only a "sheet"), is recorded on a book which contains a plurality of sheets and serves as a unit for recordation and handling (hereinafter called only a "book"). The book is recorded on the hard disk. More specifically, a Chart sheet file 141*a* which includes a previously created graph-model form which is changed into a file, and a category list file 141*b* (means for recording category information) which is obtained by changing the category list ("category" serves as a forming unit of the graph) into a file, are recorded on a book-by-book basis.

Figure 2A:
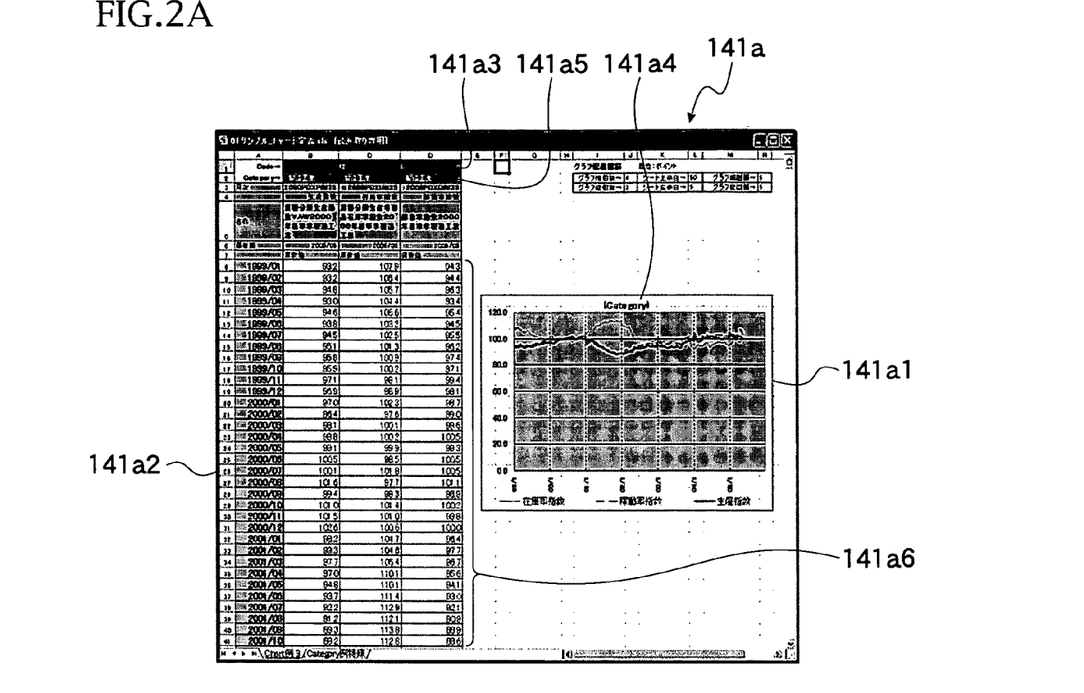
FIG. 2A is an image diagram of a Chart sheet file.
Figure 2B:
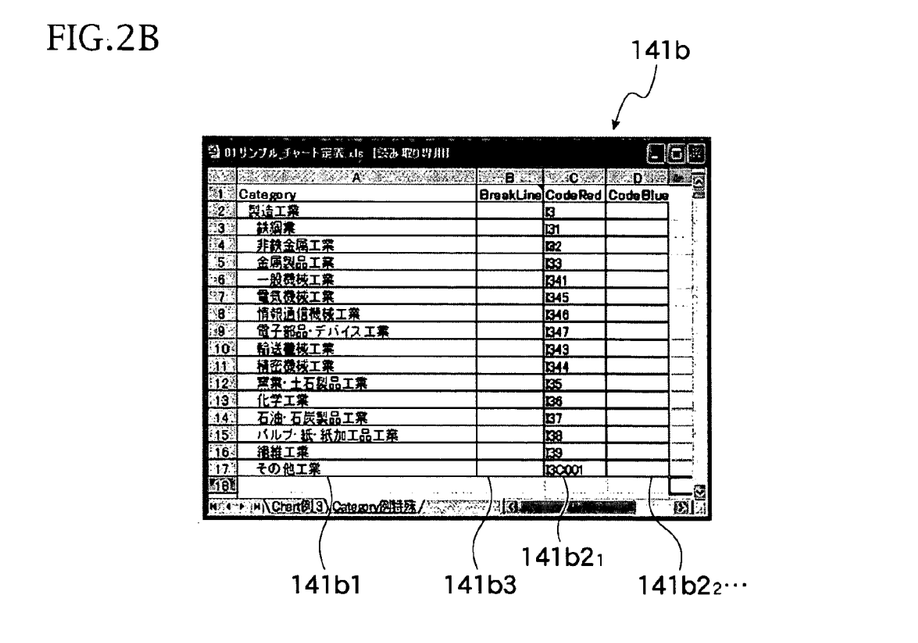
FIG. 2B is an image diagram of a category list file.

FIG. 2A is an image diagram of the Chart sheet file 141*a*. FIG. 2B is an image diagram of the category list file 141*b*. As shown in these FIGS, the Chart sheet file 141*a* includes a graph-model form 141*a*1 having a plot area displayed in a graph area, and a data table 141*a*2 which includes an original data from which the graph in the plot area is created. In the graph area of the graph-model form 141*a*1, a category field 141*a*4 is provided, on which the name of the category of the graph in the plot area is displayed. A unique code (combination of letters or numeric characters) uniquely corresponding to each category is inputted into a code line 141*a*3 in the data table 141*a*2, and a plurality of unique colors (for example 256 colors provided previously, each of which corresponds to each category) is used for coloring a cell of the code line 141$a$3. A category name for each column is listed in the category line 141$a$5 of the data table 141$a$2. Actual numeric values of each category are listed in each column of a numeric field 141$a$6. A category list file 141$b$ is a table including a category column 141$b$1 into which a category (kind of business in this embodiment) is inputted, a code column 141$b2_1$, 141$b2_2$, - - - , 141$b2_n$ (n>1) into which the code for each category is inputted, and a line-feed and page-feed column 141$b$3 into which a line-feed sign and a page-feed sign (not shown) are inputted. Each line forms one data unit. The code columns 141$b2_1$, 141$b2_2$, - - - , 141$b2_n$ are each colored using, for example, 256 colors in the same manner as in the code line 141$a$3 of the data table 141$a$2. Hereinafter the code columns 141$b2_1$, 141$b2_2$, - - - , 141$b2_n$ are collectively called as the code column 141$b$2 except that there is a need to distinguish them from each other, as these code columns each has the same constitution.

In FIG. 1, the communication server 2 is represented by a Web server having data communication function through the internet 4.

The economic statistics database server 3 has a hard disk, etc. which has a large data memory capacity and can accumulate a large amount of data table in the form of file data. The file data includes a predetermined numerical-value information. In this embodiment, the predetermined numerical-value information is a term referring to a numerical value in the past 20 to 30 years, which corresponds to the past economic trend and/or the past business conditions such as an economic trend information, interest-rate trend information, real estate trend information, etc. These predetermined numerical-value information is classified into each code of category and then accumulated (see FIG. 2).

Next, the function of the device mentioned above will be explained.

Figure 3:
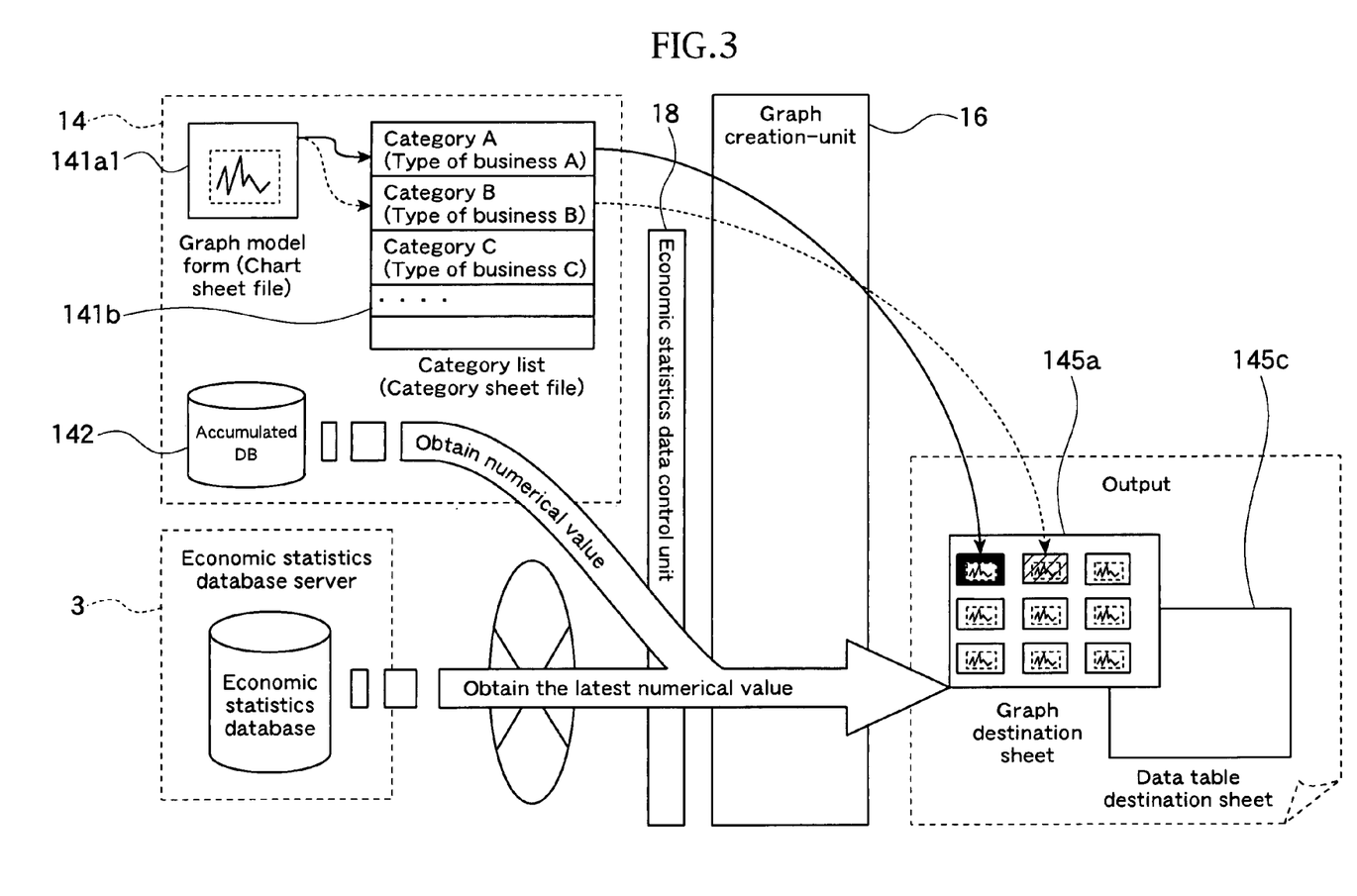
FIG. 3 is an image diagram showing a principle of chart creation of the chart display system of the present invention.

FIG. 3 is an image diagram showing the principle of the chart creation of the chart display system 1A of the present invention. As shown in this figure, the graph creation unit 16 displays a plurality of charts side-by-side ("chart" has the same meaning of "graph" in the present specification) on one graph destination sheet 145$a$ (or graph display sheet). The term "a plurality of charts" means charts created by applying one graph-model form 141$a$1 to a plurality of categories in the category list file 141$b$. The graph creation unit 16 makes the economic statistics data control unit 18 obtain the predetermined numerical values from the accumulated database 142 or the economic statistics database server 3, and displays the predetermined numerical values in the form of chart on the graph destination sheet 145$a$. The "predetermined numerical values" are values corresponding to charts displayed on the graph destination sheet 145$a$. The numerical values are recorded and displayed as a numerical value table on a data table destination sheet 145$c$.

Figure 4:
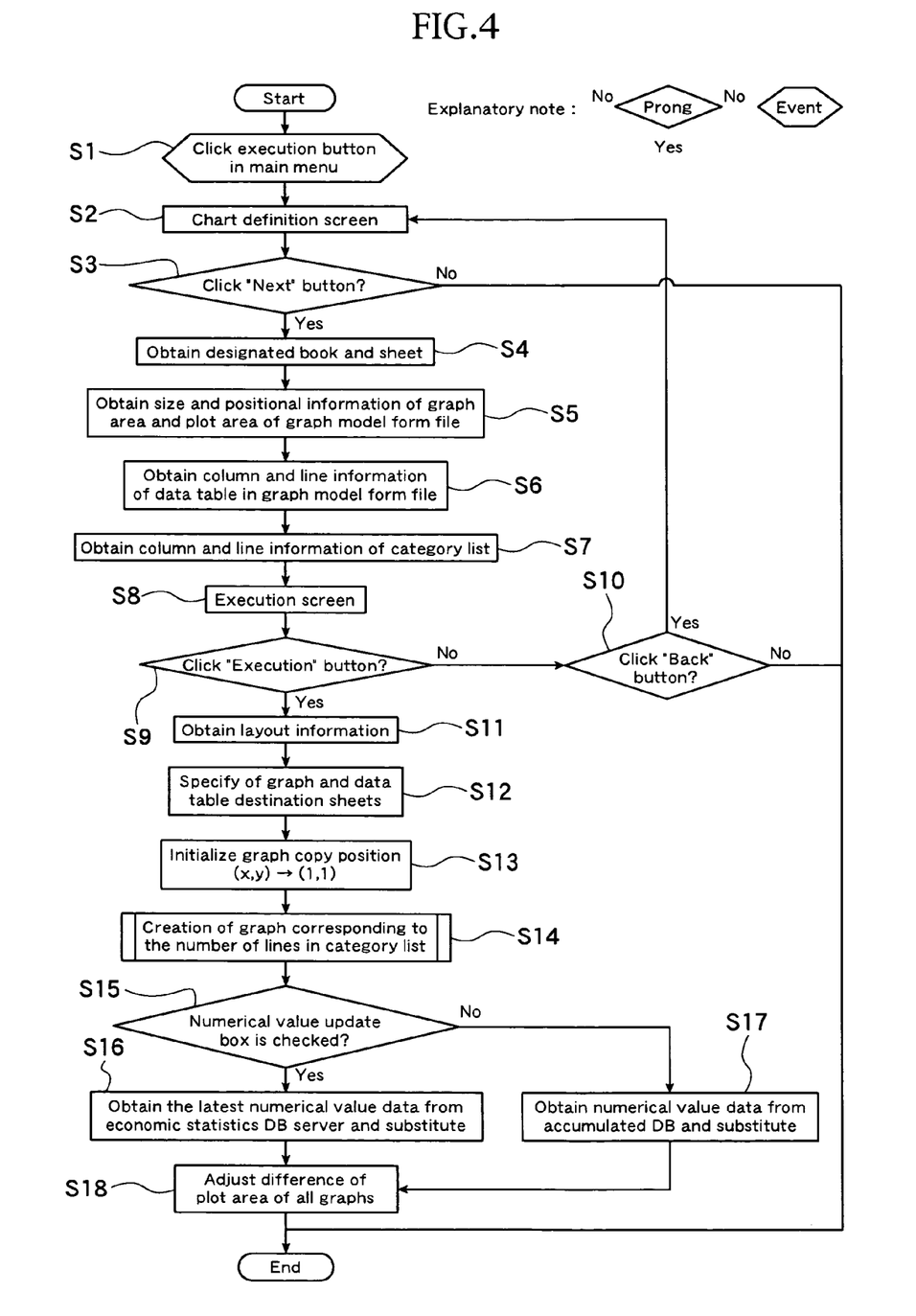
FIG. 4 is a flow chart showing steps of chart creation in the chart display system 1A of the present invention.

FIG. 4 is a flow chart showing steps of the chart creation of the chart display system 1A of the present invention. The steps will be explained with reference to the flow chart. Main screens displayed at the display unit 13 will also be explained.

Figure 7A:
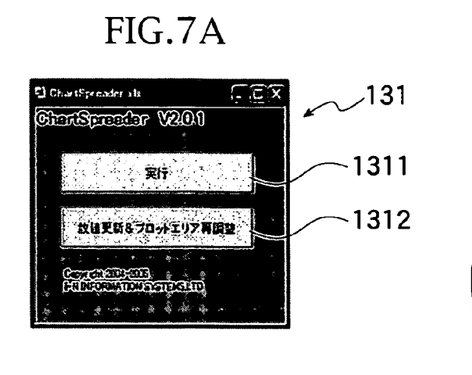
FIG. 7A is an image diagram showing a main menu screen.
Figure 7B:
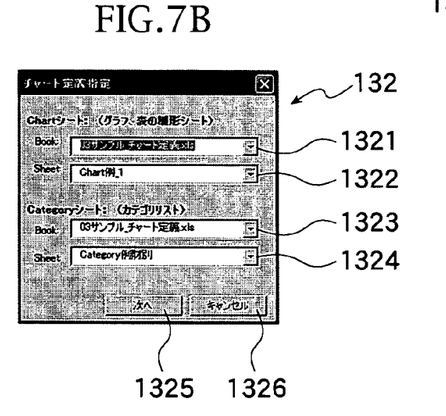
FIG. 7B is an image diagram showing a chart definition specification screen.

When the operation of the system is started through operation of the operating unit 12 by an operator, a main menu screen 131 is displayed on the display unit as shown in FIG. 7A. When "Execution button" 1311 on the screen is clicked through the operating unit 12 (step S1), a chart definition screen 132 is displayed on the display unit 13, as shown in FIG. 7B (step S2).

A plurality of pull-down list boxes are provided in the chart definition screen 132 so that selection relating to the Chart sheet file 141$a$ and the category list file 141$b$ can be made. In FIG. 7B, selection items of the Chart sheet file 141$a$ is listed in a book file selection field 1321 and a sheet file selection field 1322. And selection items of the category list file 141$b$ are listed in a book file selection field 1323 and a sheet file selection field 1324. When the "Next" button 1325 is clicked at this stage, ("Yes" at the step S3), the graph creation unit 16 obtains:

a selected book file and a selected sheet file from the chart sheet file 141$a$ and the category list file 141$b$ in the memory unit 14 (step S4);

size and positional information on a graph area and a plot area of a graph-model form 141$a$1 of the chart sheet file 141$a$ (step S5);

information on the number of lines and columns of the numerical value field 141$a$6 in the data table 141$a$2 (step S6); and information on the number of columns and lines of the category list file 141$b$ (step S7), then displays an execution screen (FIG. 7C) on the display unit 13 (step S8).

When "Cancel" button 1326 is clicked at step S3 ("No" in step S3), the process is brought to the end.

Figure 7C:
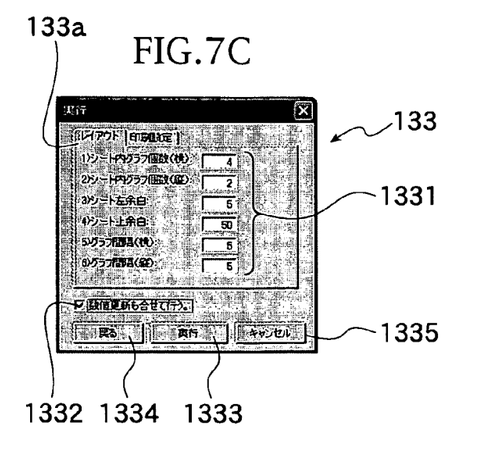
FIG. 7C is an image diagram showing an execution screen.

FIG. 7C shows a stage where the layout tab 133$a$ of the execution screen is clicked. In the layout tab 133$a$, input boxes 1331 into which the number of lines and columns, margin and distance between graph areas of graphs to be displayed on the graph destination sheet (145$a$) are inputted in a text format (see FIG. 8), and an update check box 1332 for updating the numerical values of a graph to the latest ones, are displayed. In FIG. 7C, numerical values are inputted into the input box 1331 and the update check box 1332 is checked. In addition, in a print tab 133$b$ of the execution screen 133, an input field for setting up a printing form is displayed (not shown).

Figure 8:
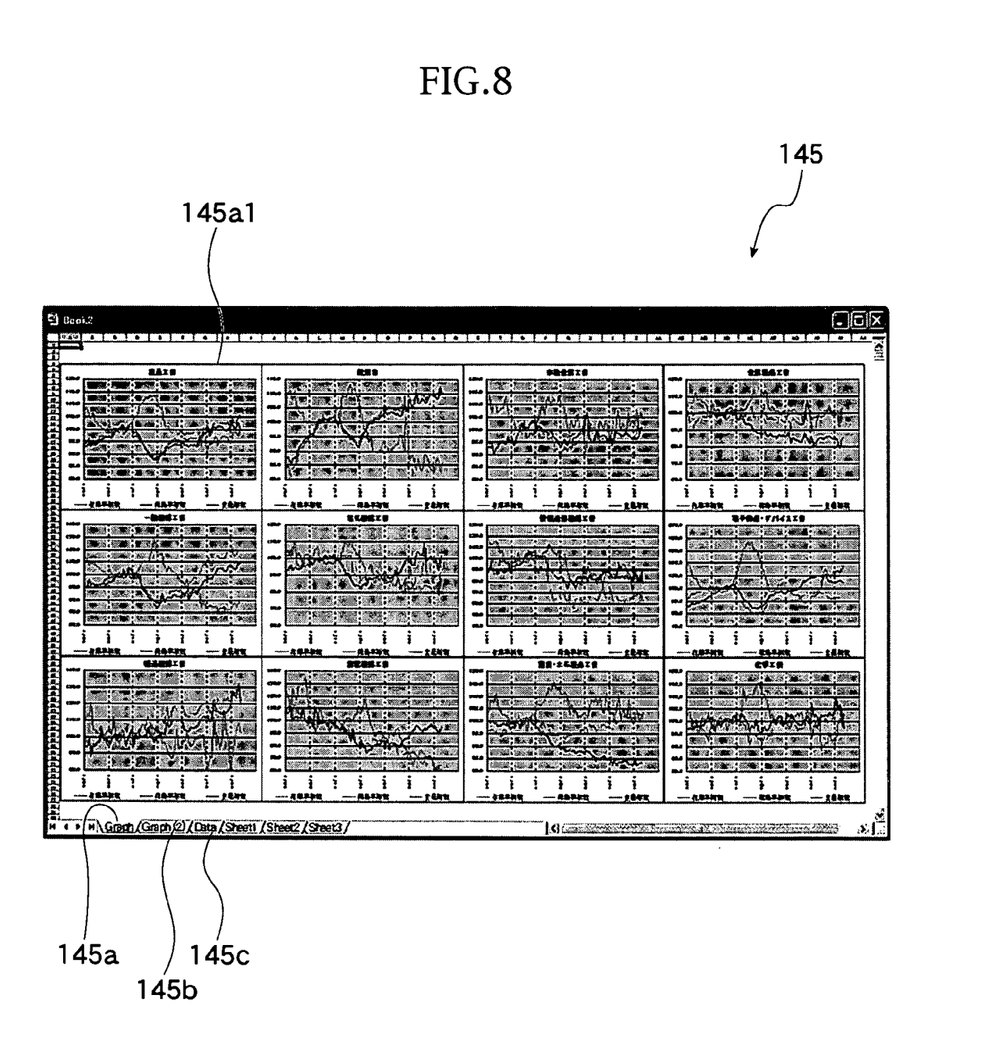
FIG. 8 is an image diagram showing a graph destination sheet etc.

At this stage, when the execution button 1333 is clicked through the operation of the operation unit 12 ("Yes" at step S9), the graph creation unit 16 executes following steps:

obtaining information inputted into the layout tab 133$a$ (step S11);

making a new book containing a plurality of sheets and setting up one of sheets as a graph destination sheet 145$a$ on which a graph-model form 141$a$1 is copied (see FIG. 8), and setting up another one of sheets as a data table destination sheet 145C on which a data table 141$a$2 is copied (see FIG. 8) (step S12);

initializing a copy position (column x, line y) to a position (column 1, line 1) to which the graph-model form 141$a$1 is copied (step S13); and performing graph creating process for creating a graph on the graph destination sheet 145$a$ (step S14) (see FIG. 8).

When "Back" button 1334 is clicked in the execution screen 133 ("No" at step S9 and "Yes" at step S10), the chart definition specification screen 132 reappears (step S2). When "Cancel" button 1335 is clicked in the execution screen 133 ("No" at step S9 and "No" at step S10), the process is brought to the end.

When the update check box 1332 is checked in the execution screen 133 ("Yes" at step S15), the graph amendment unit 17 executes following steps:

making the economic statistics data-control unit 18 obtain the latest data from the economic statistics database server 3;

replacing the obtained latest data with values in the data table 141$a$2 in the Chart sheet file 141$a$ which is copied onto the data table destination sheet 145$c$, and plotting them on a graph (step S16); and adjusting differences of plot areas for all graphs on all graph destination sheets 145$a$ caused from the plotting of the numerical value data (step S18).

When the update check box 1332 is not checked in the execution screen 133 ("No" at step S15), the graph amendment unit 17 makes the economic statistics data-control unit 18 obtain economic statistics data accumulated in the accumulated database 142, replaces the obtained data with values in the data table 141a2 in the Chart sheet file 141a which is copied onto the data table destination sheet 145c (step S17), and performs the process of the step 18.

Figure 5:
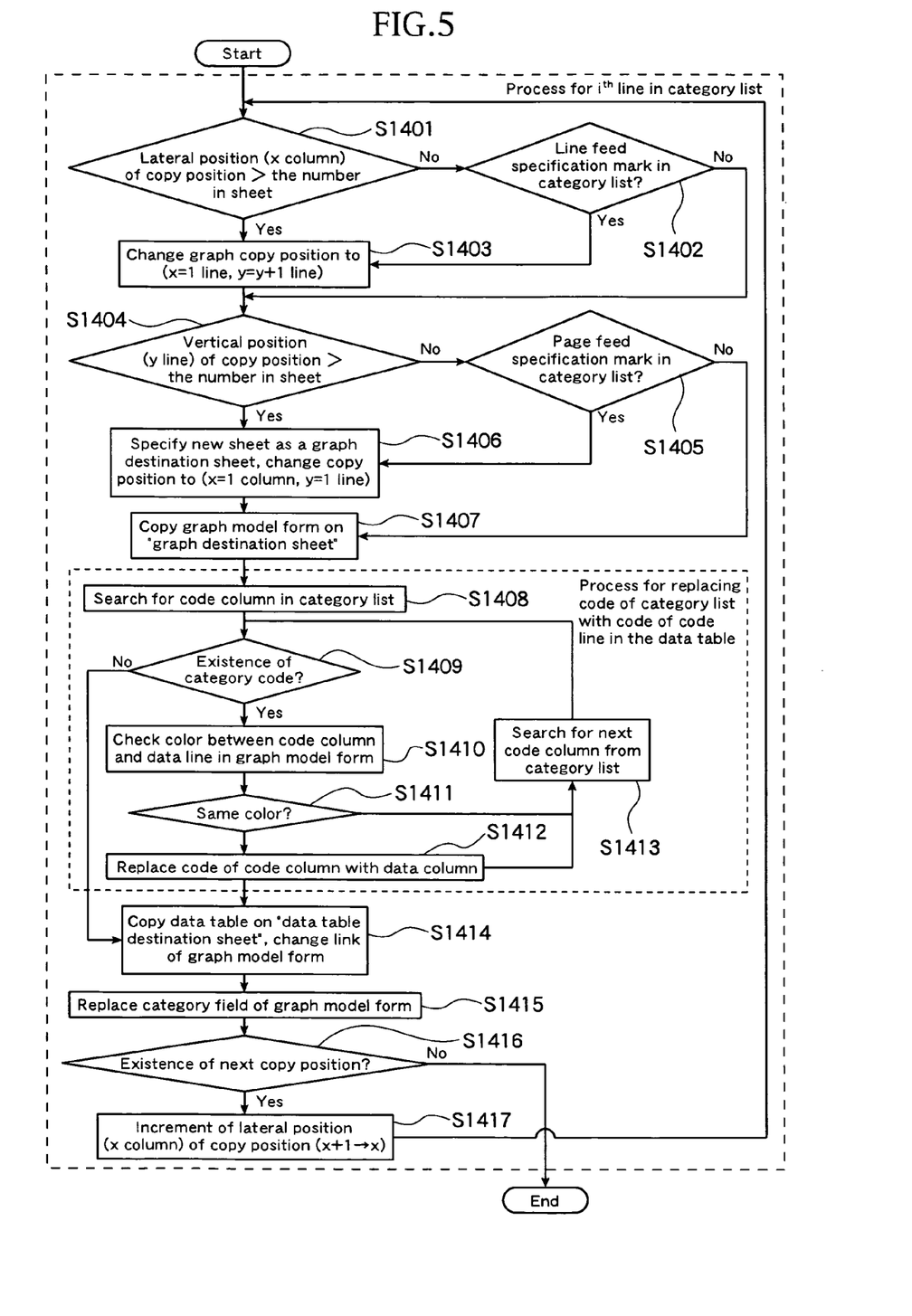
FIG. 5 is a flow chart showing details of a chart creation procedure at a graph destination sheet on which a graph is copied.

FIG. 5 is a flow chart showing details of a chart creation process at the graph destination sheet 145a (see FIG. 8). The procedure will be explained using the same Figure.

The graph creation unit 16 confirms the copy position (column x, line y) of the graph-model form 141a1 based on the obtained information obtained from a layout tab 133a. When lateral position (column x) of a copy position exceeds the predetermined number of the graphs in the sheet in the lateral direction ("Yes" at step S1401), the copy position is changed to a position (x=column 1, y=y+1 line) and line-feeded (step S1403). When lateral position (column x) does not exceed the number in the sheet in the lateral direction ("No" at step 1401), the graph creation unit 16 confirms presence or absence of a record of a line-feed specification mark in a line-feed and page-feed column 141b3 at $i^{th}$ line of the category list file 141b. When the record is found ("Yes" at step S1402), the step S1403 is executed. When the record is not found ("No" at step S1402), the step S1403 is not executed.

Following the execution of "No" at the step S1403 and S1402, the graph creation unit 16 confirms the vertical position (y line) of the copy position. When the vertical position (y line) of the copy position exceeds the number in the sheet in the vertical direction ("Yes" at step S1404), the graph creation unit 16 sets up a new sheet as a new graph destination sheet 145b (see FIG. 8) and changes the copy position to the most upper left box (x=column 1, y=line 1) of the new graph destination sheet 145b (step S1406). The graph creation unit 16 confirms presence or absence of the record of a page-feed specification mark of the line-feed and page-feed column 141b3 of $i^{th}$ line in the category list file 141b. When the record is found ("Yes" at step S1405), the step S1406 is executed. When record is not found, ("No" at step S1405), the step S1406 is not executed.

Following the execution of "No" at the step S1406 and S1405, the graph creation unit 16 copies the graph-model form 141a1 of the graph sheet file 141 onto a copy position of the graph destination sheet 145a (step S1407) based on information of the copy position (column x, line y) obtained at the step of S1401-S1406, size and positional information of the graph area and plot area of the graph-model form 141a1 obtained at the step S5, and information inputted into the layout tab 133a obtained at step 11.

The graph creation unit 16 performs a search for a code column 141b2 in the category list file 141b (step S1408). When the code column 141b2 is found ("Yes" at step S1409), the graph creation unit 16 performs a search for color information given to the first code column (the leftmost code column 141b2$_1$), collates the color with a color given to each cell of the code line 141a3 of the data table 141a2 (step S1410), and replaces the code recorded onto the code column 141b2$_1$ with the code of the cell of the code line 141a3 of the data table 141a2 (step S1412) when the colors of both cells are the same (step S1412). Following the replacement (step S1412) or when both colors are found different from each other at the step of collation ("No" at step S1411), the graph creation unit 16 shifts its search target to the second code column (second code column 141b2$_1$ from left) and performs the same procedure again from the step 1409.

When the code column 141b2 to be searched no longer exists (in other words, when searching procedure all over the code columns 141b2$_1$, 141b2$_2$, 141b2$_n$ has been completed), ("No" at step S1409), the graph creation unit 16 copies the data table 141a2 in the Chart sheet file 141a onto the data table destination sheet 145c (see FIG. 8), changes a link of the graph copied onto the graph destination sheet 145a at the step S1407 to a data table copied onto the data table destination sheet 145c (step S1414), and replaces the category name of the category field 141a4 of the graph-model form 141a1 with the category name listed in the category column 141b1 corresponding to the category list file 141b (step S1415).

When there is a next copy position on the graph destination sheet 145a ("Yes" at step S1416), the graph creation unit 16 performs increment (x+1→x) of the lateral position (column x) of the copy position and increment (i+1→i) of the $i^{th}$ line of the category list file 141b (step S1417), and repeats the same procedure from the step S1401 until the next copy position on the graph destination sheet 145a or the next line of the category list file 141b no longer exists ("No" at step S1416).

According to the procedure mentioned above, a plurality of charts are displayed in a matrix manner on the graph destination sheet 145a, as shown in FIG. 8. Where the chart are made by plotting a predetermined numerical-value information corresponding to the category of the category list file 141b onto the size-adjusted graph-model form 141a1.

Figure 6:
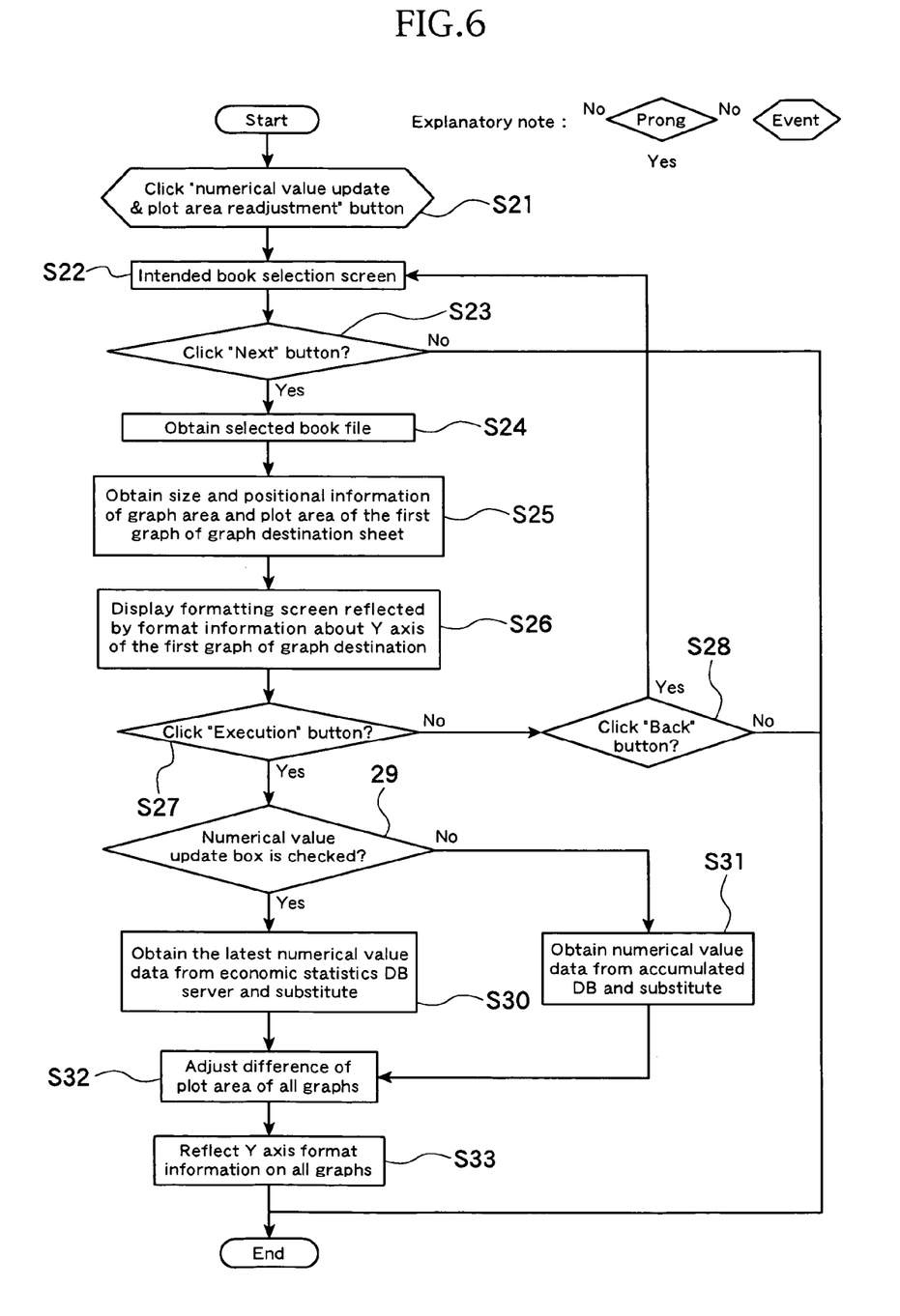
FIG. 6 is a flow chart in the chart display system of the present invention, showing steps to adjust a plot area of a chart displayed on a graph destination sheet.

FIG. 6 is a flow chart in the chart display system of the present invention, showing steps to adjust a plot area and to update the numerical value displayed on the graph destination sheet 145a to the latest information. The steps will be explained below using the flow chart. Main screens displayed on the display unit 13 at each steps will also be explained.

Figure 7D:
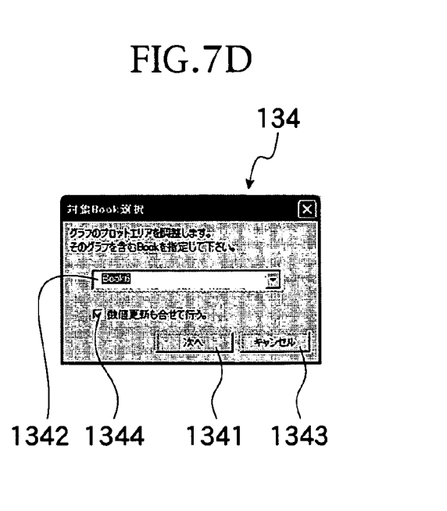
FIG. 7D is an image diagram showing an intended-book selection screen.

When a numerical value update & plot area readjustment button 1312 is clicked at the main menu screen 131 (FIG. 7A) (step S21), the graph amendment unit 17 displays an intended book selection screen 134 (shown in FIG. 7D) on the display unit 13 (step S22). When "Next" button 1341 in the screen is clicked through operation of the operation unit 12 ("Yes" at step S23), the graph amendment unit 17 executes the following steps:

obtaining a book file displayed on the intended book selection field 1342 of the intended book selection screen 134 (step S24);

obtaining size information of the graph and the plot areas of the first graph 145a1 (or a graph displayed on line 1, column 1) in the graph destination sheet 145a in the same book file, and positional information in the graph destination sheet 145a (step S25); and obtaining format information of Y axis of the first graph 145a1 in the graph destination sheet 145a1 (information about scaling of Y axis) and displaying a formatting screen which is reflected by the obtained information (step S26).

Figure 7E:
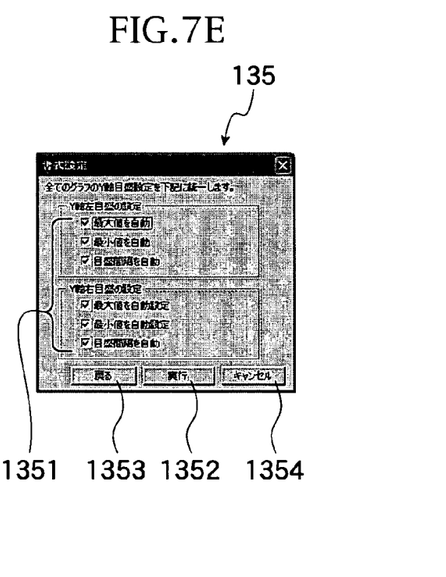
FIG. 7E is an image diagram showing a formatting screen.

FIG. 7E is an image diagram showing a formatting screen 135. When "Cancel" button 1343 in the intended book selection screen 134 is clicked ("No" at step S23), execution is brought to the end.

Following the step S26, the check boxes 1351 in the formatting screen 135 are properly selected through operation of the operation unit 12, and when the execution button 1352 is clicked ("Yes" at step S27) and a numerical value update check box 1344 of the intended book selection screen 134 (FIG. 7D) is checked ("Yes" at step S29), the graph amendment unit 17 orders the economic statistics data control unit 18 to obtain the latest numerical value data from the economic statistics database server 3, and replaces the numerical value data of each chart displayed on the graph destination sheet 145a with the data based on the obtained numerical value data (step S30). When the numerical value update checkbox 1344 is not checked ("No" at step S29), the graph amendment unit 17 orders the economic statistics data control unit 18 to obtain numerical value data from the accumulated database 142, and replaces the numerical value data of each graph chart displayed on the graph destination sheet 145a with the data based on the obtained numerical value data (step S31).

Following the step S26, when "Back" button 1353 in the formatting screen 135 is clicked ("Yes" at step S28), the intended book selection screen 134 is redisplayed on the display unit 13 (step S22). When "Cancel" button 1354 in the formatting screen 135 is clicked ("No" at step S28), execution is brought to the end.

Following the step S30 and S31, the graph amendment unit 17 adjusts, based on the information of the first graph 145a1 of the graph destination sheet 145a obtained at step S25, differences in the size of the plot areas in the graph destination sheet 145a, which are caused from the replacement of the numerical values at step S30 and S31, (step S32). That is, the size of the plot area of all graph charts displayed on the graph destination sheet 145a is adjusted to the same size as that of the first graph 145a1.

The graph amendment unit 17 makes information that relates to the setting of the scale of Y axis and that is inputted into the check box 1351 of the formatting screen 135 (FIG. 7E) be reflected on all charts displayed in the graph destination sheet 145a (step S33).

According to the procedures mentioned above, as shown in FIG. 8, a plurality of charts are displayed on the graph destination sheet 145a in such a manner that each plot area size becomes approximately the same size.

In this embodiment, a plurality of the same graph-model forms 141a1 can easily be displayed on one graph destination sheet 145a, and a predetermined numerical-value information can graphically be displayed onto the graph model forms, by:

obtaining size information on the size of a previously created graph-model form 141a1;

determining the size and position of the graph-model form 141a1 on the graph destination sheet 145a;

displaying the graph-model form on the graph destination sheet 145a after adjusting the size of the copied graph-model form 141a1 based on the determination;

obtaining a predetermined numerical-value information from the accumulated database 142 or the economic statistics database server 3; and graphically displaying the predetermined numerical-value information onto the graph-model form 141a1 which is displayed on the graph destination sheet 145a.

Therefore, a plurality of graphs can easily be displayed on one graph destination sheet 145a.

According to the embodiment, the display size and the display position of the graph-model form 141a1 can be determined based on the information on the number of category of a predetermined numerical-value information accumulated in the accumulated database 142 or the economic statistics database server 3. Accordingly, the size and the position of the graphs to be displayed on the graph destination sheet 145a can be determined based on the number of graphs to be displayed. In addition, in the present invention, predetermined numerical-value information corresponding to a category is obtained, and then the information is graphically displayed onto one of graph-model forms 141a1 displayed on the graph destination sheet 145a. Accordingly, numerical-value information of different categories can be displayed individually on a plurality of graphs created based on the same graph-model form 141a1.

According to the present invention, a plurality of graph-model forms 141a1 are displayed onto the graph destination sheet 145a in a matrix manner. Accordingly, a plurality of numerical-value information can graphically be displayed in an easy-to-read manner on the graph destination sheet 145a.

According to the present invention, a plurality of graphs displayed on the graph destination sheet 145a are adjusted so as to have approximately the same display size. Accordingly, in a case where the size of the plot area of a plurality of the graphs displayed on the graph destination sheet 145a is different to each other, the display size of the graphs can be adjusted to have approximately the same size. And size of the graphs displayed on one screen can properly be adjusted, being able to obtain an easy-to-read screen.

In the embodiment described above, the graph display device 1 is used to create a chart from numerical values of credits, shares, etc. The present invention is not limited to them. The invention can be used to create graphs for all numerical values (for example, research data obtained by academic researches, etc.)

In the embodiment mentioned above, the graph display device 1 is applied to a computer terminal which can be attached to network connections, but the device 1 of the present invention can be used as a system having a plurality of client terminals with the same effects of the present invention by providing a server of a client server system with the function of the graph display device 1 so that the present invention can be realized in a network environment.

The embodiments described above are only examples and the present invention is not limited only to those embodiments.

What is claimed is:

1. A chart display device, comprising:

model-form information obtaining means for obtaining a size information of a previously prepared graph-model form;

display-style decision means for deciding a display size and a display position of the graph-model form on a graph display sheet on which a graph is screen displayed;

model-form display means having a function of copying the graph-model form, adjusting the display size of the copied graph-model form based on the decision of the display-style decision means, and displaying the adjusted graph-model form or a plurality of the adjusted graph-model forms at the display position of the graph display sheet;

numerical-value obtaining and displaying means for obtaining a predetermined numerical-value information, and creating a graph by plotting the predetermined numerical-value information onto the adjusted graph-model form displayed on the graph display sheet; and recording means for recording a category information as a forming unit of the graph, wherein the display-style decision means obtains the category information and decides the display size and the display position of the graph-model form based on a number of the category, the numerical-value obtaining and displaying means obtains the prescribed numerical-value information corresponding to the category, and graphically displays the predetermined numerical-value information onto the graph-model form displayed on the graph display sheet, the numerical-value obtaining and displaying means confirms a copy position (x,y), where x represents the column and y represents the line, of the graph-model form based on the obtained information, changes the copy position to a position (1,y+1) when a lateral position of the copy position exceeds a predetermined number of graphs on the sheet in the lateral direction and line-feeds the copy position, sets up a new sheet as a new graph display sheet and changes the copy position to an upper most left box (1,1) of the new graph display sheet when a vertical position of the copy position exceeds a number in the sheet in the vertical position, and copies the graph-model form of the graph sheet file onto a copy position of the graph display sheet, and the model-form display means displays plurality of the adjusted graph-model forms in a matrix manner on the graph display sheet.

2. A chart display device according to claim 1, wherein the graph display device further comprises graph amendment means for adjusting the size of a plurality of the graphs displayed on the graph display sheet so that all of the graphs have approximately the same display size.

3. A chart display device according to claim 1, wherein the numerical-value obtaining and displaying means performs a search for a code column in a category list file and, when the code column is found, the graph creation unit performs a search for color information given to the first code column, collates the color with a color given to each cell of the code line of the data table, and replaces the color code recorded onto the code column with the color code of the cell of the code line of the data table when the colors of both cells are the same, the graph creation unit, following the replacement or when the colors are different, shifts a search target to the second code column and repeats the above procedures, when a code column to be searched no longer exists, the graph creation unit copies the data table in the chart sheet file onto the data table destination sheet, changes a link of the graph copied onto the graph display sheet, and replaces the category name of the category filed of the graph-model form with the category name listed in the category column corresponding to the category list file, and when there is a next copy position on the graph display sheet, the graph creation unit performs an increment of x+1 to x of the lateral position of the copy position and an increment of i+1 to i of the ith line of the category list file, and repeats this procedure until the next line of the category list file no longer exists.

4. A chart display device, comprising:
model-form information obtaining means for obtaining a size information of a previously prepared graph-model form;
display-style decision means for deciding a display size and a display position of the graph-model form on a graph display sheet on which a graph is screen displayed;
model-form display means having a function of copying the graph-model form, adjusting the display size of the copied graph-model form based on the decision of the display-style decision means, and displaying the adjusted graph-model form or a plurality of the adjusted graph-model forms at the display position of the graph display sheet;
numerical-value obtaining and displaying means for obtaining a predetermined numerical-value information, and creating a graph by plotting the predetermined numerical-value information onto the adjusted graph-model form displayed on the graph display sheet; and
recording means for recording a category information as a forming unit of the graph, wherein the display-style decision means obtains the category information and decides the display size and the display position of the graph-model form based on a number of the category, the numerical-value obtaining and displaying means obtains the prescribed numerical-value information corresponding to the category, and graphically displays the predetermined numerical-value information onto the graph-model form displayed on the graph display sheet, the numerical-value obtaining and displaying means confirms a copy position (x,y), where x represents the column and y represents the line, of the graph-model form based on the obtained information, changes the copy position to a position (1,y+1) when a lateral position of the copy position exceeds a predetermined number of graphs on the sheet in the lateral direction and line-feeds the copy position, sets up a new sheet as a new graph display sheet and changes the copy position to an upper most left box (1,1) of the new graph display sheet when a vertical position of the copy position exceeds a number in the sheet in the vertical position, and copies the graph-model form of the graph sheet file onto a copy position of the graph display sheet, the graph display device further comprises graph amendment means for adjusting the size of a plurality of the graph displayed on the graph display sheet so that all of the graphs have approximately the same display size, and the graph amendment means obtains size information of the graph and plot areas and Positional information of the first graph in the graph display sheet, obtains format information of a y-axis of the first graph in the graph display sheet and displays a formatting screen that is reflected by the obtained information, obtains the latest numerical value data and replaces the numerical value data of each chart displayed on graph display sheet with the data based on the obtained numerical value data and adjusts, based on the information of the first graph of the obtained graph display sheet, differences in the size of the plot areas in the graph display sheet, such that the sizes of the plot areas of all graph charts displayed on the graph display sheet are adjusted to the same size as that of the first graph.

5. A computer-readable medium encoded with a computer program for functioning as a chart display device, the program when executed by a computer causes the computer to perform a method comprising:

obtaining a size information of a previously prepared graph-model form;
deciding a display size and a display position of the graph-model form on a graph display sheet on which a graph is screen displayed;
copying the graph-model form, adjusting the display size of the copied graph-model form based on the deciding, and displaying the adjusted graph-model form or a plurality of the adjusted graph-model forms at the display position of the graph display sheet;
obtaining a predetermined numerical-value information, and creating a graph by plotting the predetermined numerical-value information onto the adjusted graph-model form displayed on the graph display sheet;
recording a category information as a forming unit of the graph;
obtaining the category information and deciding the display size and the display position of the graph-model form based on a number of the category;

obtaining the prescribed numerical-value information corresponding to the category, and graphically displaying the predetermined numerical-value information onto the graph-model form displayed on the graph display sheet;

confirming a copy position (x,y), where x represents the column and y represents the line, of the graph-model form based on the obtained information, changing the copy position to a position (1,y+1) when a lateral position of the copy position exceeds a predetermined number of graphs on the sheet in the lateral direction and line-feeds the copy position, setting up a new sheet as a new graph display sheet and changing the copy position to an upper most left box (1,1) of the new graph display sheet when a vertical position of the copy position exceeds a number in the sheet in the vertical position, and copying the graph-model form of the graph sheet file onto a copy position of the graph display sheet;

adjusting the size of a plurality of the graphs displayed on the graph display sheet so that all of the graphs have approximately the same display size; and obtaining size information of the graph and plot areas and positional information of the first graph in the graph display sheet, obtaining format information of a y-axis of the first graph in the graph display sheet and displaying a formatting screen that is reflected by the obtained information, obtaining the latest numerical value data and replacing the numerical value data of each chart displayed on graph display sheet with the data based on the obtained numerical value data, and adjusting, based on the information of the first graph of the obtained graph display sheet, differences in the size of the plot areas in the graph display sheet, such that the sizes of the plot areas of all graph charts displayed on the graph display sheet are adjusted to the same size as that of the first graph.

6. A computer-readable medium encoded with a computer program for functioning as a chart display device, the program when executed by a computer causes the computer to perform a method comprising:

obtaining a size information of a previously prepared graph-model form;

deciding a display size and a display position of the graph-model form on a graph display sheet on which a graph is screen displayed;

copying the graph-model form, adjusting the display size of the copied graph-model form based on the deciding, and displaying the adjusted graph-model form or a plurality of the adjusted graph-model forms at the display position of the graph display sheet;

obtaining a predetermined numerical-value information, and creating a graph by plotting the predetermined numerical-value information onto the adjusted graph-model form displayed on the graph display sheet;

recording a category information as a forming unit of the graph;

obtaining the category information and deciding the display size and the display position of the graph-model form based on a number of the category;

obtaining the prescribed numerical-value information corresponding to the category, and graphically displaying the predetermined numerical-value information onto the graph-model form displayed on the graph display sheet;

confirming a copy position (x,y), where x represents the column and y represents the line, of the graph-model form based on the obtained information, changing the copy position to a position (1,y+1) when a lateral position of the copy position exceeds a predetermined number of graphs on the sheet in the lateral direction and line-feeds the copy position, setting up a new sheet as a new graph display sheet and changing the copy position to an upper most left box (1,1) of the new graph display sheet when a vertical position of the copy position exceeds a number in the sheet in the vertical position, and copying the graph-model form of the graph sheet file onto a copy position of the graph display sheet;

adjusting the size of a plurality of the graphs displayed on the graph display sheet so that all of the graphs have approximately the same display size; and obtaining size information of the graph and plot areas and positional information of the first graph in the graph display sheet, obtaining format information of a y-axis of the first graph in the graph display sheet and displaying a formatting screen that is reflected by the obtained information, obtaining the latest numerical value data and replacing the numerical value data of each chart displayed on graph display sheet with the data based on the obtained numerical value data, and adjusting. based on the information of the first graph of the obtained graph display sheet, differences in the size of the plot areas in the graph display sheet, such that the sizes of the plot areas of all graph charts displayed on the graph display sheet are adjusted to the same size as that of the first graph.

* * * * *

UNITED STATES PATENT AND TRADEMARK OFFICE
CERTIFICATE OF CORRECTION

PATENT NO.       : 7,420,562 B2
APPLICATION NO.  : 11/332282
DATED            : September 2, 2008
INVENTOR(S)      : Noboru Shinohara et al.

It is certified that error appears in the above-identified patent and that said Letters Patent is hereby corrected as shown below:

Title Page, item [57] column 2 (Abstract), Line 1, change "desplays" to --displays--.

Column 11, Line 11, after "displays" insert --a--.

Column 12, Line 26, before "displayed" change "graph" to --graphs--.

Column 12, Line 30, change "Positional" to --positional--.

Column 12, Line 37, after "value" change "data" to --data,--.

Column 14, Line 40, change "adjusting." to --adjusting,--.

Signed and Sealed this

Twenty-fifth Day of November, 2008

JON W. DUDAS
*Director of the United States Patent and Trademark Office*